No. 11,852. Reissued Sept. 4, 1900.
E. W. RICE, JR.
SYSTEM OF TRAIN CONTROL.
(Application filed Mar. 16, 1899.)
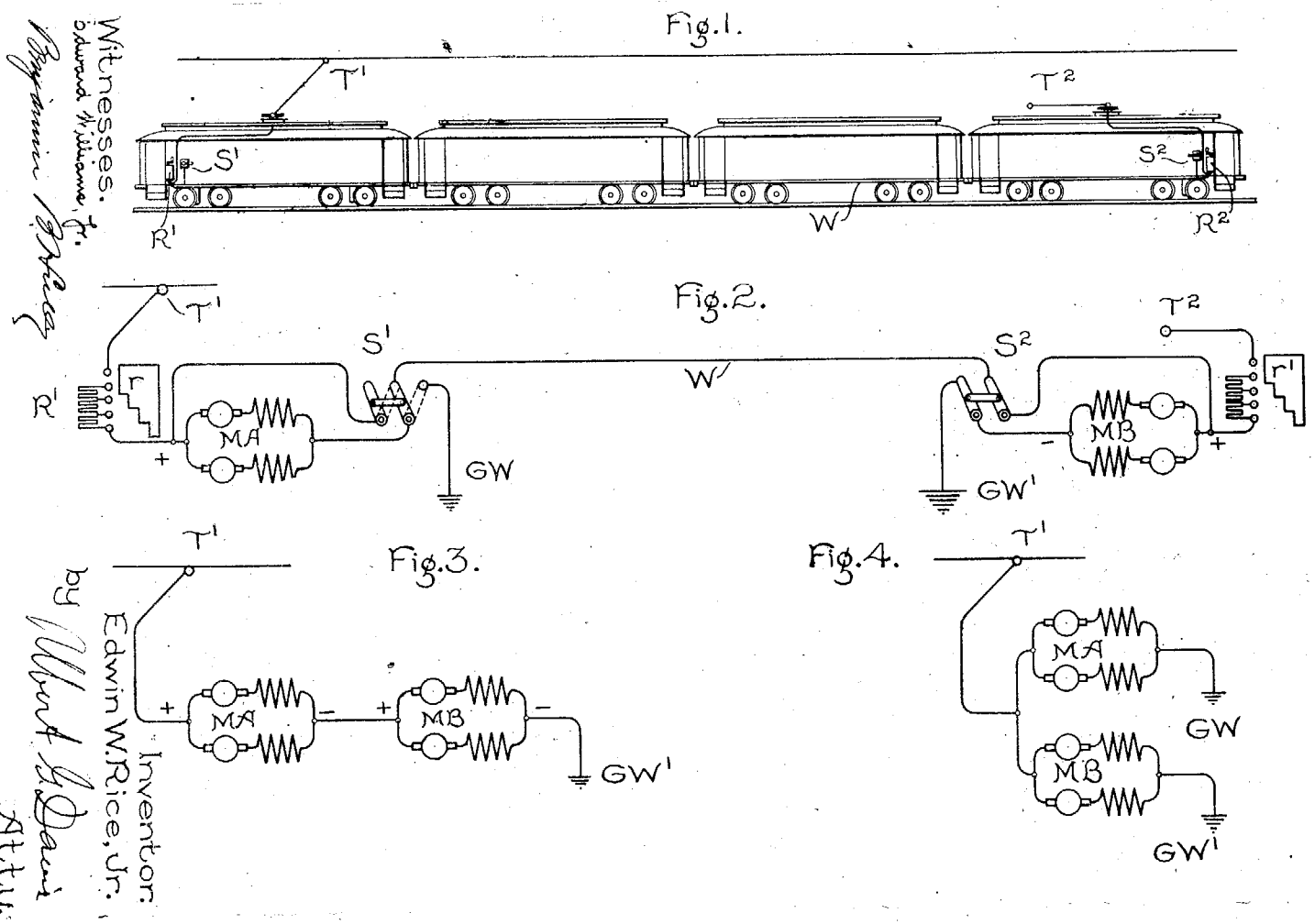
Witnesses.
Edward Williams, Jr.
Benjamin B. Riley
Inventor:
Edwin W. Rice, Jr.
by Albert G. Davis
Atty.

UNITED STATES PATENT OFFICE.

EDWIN W. RICE, JR., OF SCHENECTADY, NEW YORK, ASSIGNOR TO THE GENERAL ELECTRIC COMPANY, OF NEW YORK.

SYSTEM OF TRAIN CONTROL.

SPECIFICATION forming part of Reissued Letters Patent No. 11,852, dated September 4, 1900.

Original No. 608,301, dated August 2, 1898. Application for reissue filed March 16, 1899. Serial No. 709,345.

*To all whom it may concern:*

Be it known that I, EDWIN WILBUR RICE, Jr., a citizen of the United States, residing at Schenectady, county of Schenectady, State of New York, have invented certain new and useful Improvements in Systems of Train Control, (Case No. 1,160,) of which the following is a specification.

My invention relates to systems of electric traction. Occasion often arises for connecting two or more electrically-equipped motor-cars in a single train, when it becomes desirable to control the power and speed of the different motor equipments from a common point. For example, at certain points of a line the motor-cars may be run independently, and hence properly equipped with motors, controllers, and a trolley. At other points of the line two or more motor-cars may be run joined up in a train and subject to control by the engineer at a common point.

The main object of this invention is to provide certain improvements by which motor-cars equipped so as to run and be controlled independently may likewise be readily controlled from a single point when joined in a train without multiplying cable connections extending from one such car to another and in general with a minimum amount of additional wiring.

As will be more particularly pointed out hereinafter, by my improvements the different motor-cars may be located at different points on a train, and from a position on one of them the engineer can couple the different motor equipments in different ways—as, for example, in series or in parallel—and can regulate the motors as may be required when coupled in either order. I am able to accomplish this result when two cars only are used by providing only a single conductor connecting the different motor-cars and certain switch or controller mechanism whose function is clearly described hereinafter and whose construction may be varied in a variety of ways.

The accompanying drawings illustrate the invention.

Figure 1 shows a train of cars comprising two motor-cars which may be regulated from either end of the train. Figs. 2, 3, and 4 are diagrams of the circuit connections and series-parallel combinations in which I may couple the motor equipments of the different cars.

In Fig. 1 the motor-cars are shown at the ends of the train. Each such car has its own equipment of motors, controllers, and trolleys. A cable W extends from one car to another, and by this cable the motor equipments may be coupled up in various orders and regulated as will be explained in connection with Fig. 2. Here M A represent the motors on one car, and M B the motors on the second car. Each motor equipment is shown as consisting of a pair of motors connected and run in parallel relation. The trolleys are shown at $T'$ $T^2$, and controllers at $R'$ $R^2$. These are illustrated as rheostatic controllers consisting of a number of sections of resistance, more or less of which may be included in circuit by movement of the controller-cylinder shown developed in the diagram.

$r$ is the cylinder of one controller, and $r'$ of the second controller. The motor equipments of each car have a ground connection G W G W'. From the positive terminal of one motor equipment to the positive terminal of the second equipment there is led a cable W, and switches (shown at $S'$ $S^2$) are provided which are so arranged that the different motor equipments can be connected either in series or in parallel by an engineer stationed on one of the cars. For example, in the diagram Fig. 2 the trolley-circuit $T^2$ is opened at controller $R^2$ and switches $S'$ $S^2$ are so placed that the ground connection at motors M A is broken and a series circuit established, which includes the motor equipment M A, cable W, motor equipment M B, and ground at G W'. The circuit of controller $T'$ can now be completed at controller $R'$, and the different motor equipments will be connected in series between trolley $T'$ and ground G W' on the rear car.

Fig. 3 illustrates, diagrammatically, the manner in which the motors are connected under the conditions already explained. The engineer by manipulating controller $R'$ can of course control the power and speed of both motor equipments by cutting in and out resistance. Furthermore, by throwing switch $S'$ to the dotted-line position the different motor equipments will be connected in parallel with a corresponding increase of power and speed. The motors M A will then be connected to the trolley at their respective terminals and at their negative terminals grounded in the ordinary manner. A branch circuit leading over cable W and through switches $S'$ $S^2$ connects the motors M B in parallel with motors M A, and these last motors are grounded at G W'. Now, as before, further regulation is possible by varying the resistance included in circuit at controller R'. Fig. 4 is a diagram showing more clearly the motor equipments connected in parallel relation. Switches $S'$ $S^2$ for shifting the motor-circuits are shown diagrammatically. In practice they may be constructed and arranged in a variety of ways, either as independent switches not connected with the controllers, or additional switch-contacts may be provided on the controllers for the same purpose. My improvements are not limited in this regard. Of course couplings of any desired form will be provided to complete the circuit through cable W from car to car, as may be required.

What I claim as new, and desire to secure by Letters Patent of the United States, is—

1. The combination of motor-cars each equipped with a motor or motors, a controller and trolley, with means for controlling the different motor equipments from a single point when the cars are joined in a train, said means comprising a cable for connecting the different motor equipments, switches or switch-contacts in the trolley-circuits of the different cars, and other switches or switch-contacts for opening or closing the ground-circuits of the different cars, and coupling up the motor equipments in series or parallel.

2. The combination of motor-cars at different positions of a train, a single conductor connecting said cars, and a switch on one of the motor-cars for coupling the motor equipments of the different cars in series or parallel, as set forth.

3. The combination of motor-cars, with a single cable extending from one car to another, and switches by which the positive terminals of the motor equipments of said cars may be connected by said cable and the motor equipments run in parallel, or for establishing a connection through the same cable between the negative terminal of the motor equipment of one car and the positive terminal of the motor equipment of a second car, and thereby connecting the motor equipments in series, as set forth.

4. The combination of motor-cars, a switch on one of said cars by which the different motor equipments may be coupled in series or in parallel, and a switch or controller for further regulating all of the motors from a single point on the train, when said motor equipments are connected up in either order.

5. The combination of motor-cars, a ground connection for the motor equipments of each car, a cable extending from one motor equipment to another, and switches for breaking the ground connection of one car and connecting the different equipments in series between the trolley-circuit of one car and the ground connection of a second car, or for grounding each motor equipment independently and connecting the different equipments in parallel.

6. The combination of motor-cars, each equipped with proper complement of motors, controlling devices, and circuits, with switches on the cars by which the complete motor equipments may be coupled in series or in parallel, as desired.

7. The combination, with motor-cars coupled in a train, having a proper equipment of motors and controlling devices such that each motor-car may, if desired, be independently operated, of switches by which the complete motor equipments may be thrown in series or parallel with each other, and simultaneously regulated when in either connection by one of the motor-controllers.

8. Means for operating motor-cars from each end of a train which comprises a train-conductor system or circuit, and identical controllers on each motor-car provided respectively with devices for arranging the motors and train-conductor circuit or system in fixed combination on the rear car to drive the train forward and with devices for connecting the train-conductor circuit or system, trolley-conductor, and motors and their accessories in variable combinations on the front car, substantially as described.

In witness whereof I have hereunto set my hand this 13th day of March, 1899.

EDWIN W. RICE, JR.

Witnesses:

BENJAMIN B. HULL,

MABEL E. JACOBSON.